April 18, 1950     K. E. HILEMAN     2,504,416

MOWING MACHINE

Filed June 24, 1946

INVENTOR.
Keil E. Hileman
BY
ATTORNEY.

Patented Apr. 18, 1950

2,504,416

UNITED STATES PATENT OFFICE 2,504,416

MOWING MACHINE

Keil E. Hileman, Overland Park, Kans., assignor to National Metal Products Company, Kansas City, Mo.

Application June 24, 1946, Serial No. 678,810

1 Claim. (Cl. 56—25.4)

This invention relates to mowing machines of the character usually employed in cutting blue grass lawns where the grass cuttings are left as a mulch and the primary aim of the invention is the provision of a power driven mowing machine having, as a part thereof, means for dispersing the grass cuttings as the mowing operation progresses.

A further important object of this invention is to provide a mowing machine of the aforementioned character wherein the exhaust of the internal combustion engine forming a part of the equipment is utilized as a medium for dispersing grass cuttings.

Additional aims of this invention are to provide a mowing machine having grass cutting dispersing means that is continuously actuated simultaneously with the movement of the cutting blade; having means for releasing a blast of fluid into the zone where the cutting action is occurring; and having unique and positive elements for directing the exhaust gases of the engine to a zone where grass cuttings will not collect in rows or bunches but be evenly dispersed beneath the frame of the mowing machine as the latter travels over the lawn.

Other aims of the invention will appear during the course of the following specification referring to the accompanying drawing wherein.

Figure 1:
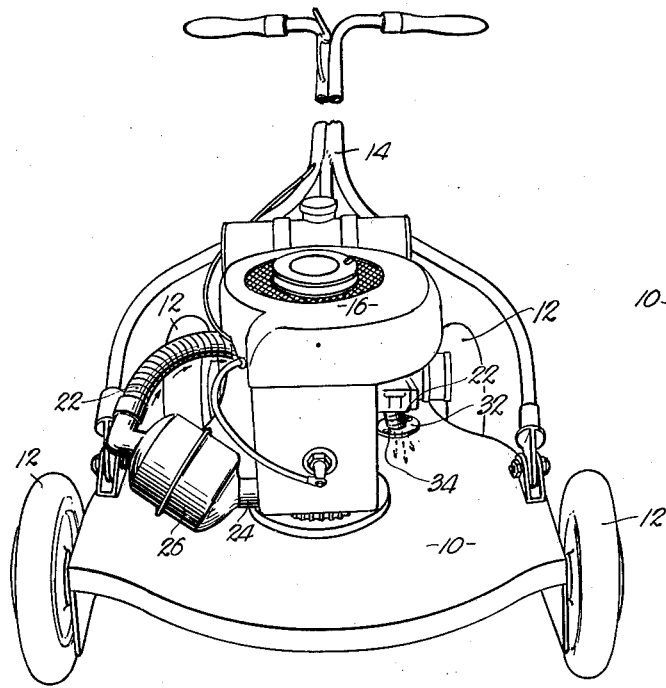
Figure 1 is a perspective view of the mowing machine made in accordance with the present invention.
Figure 3:
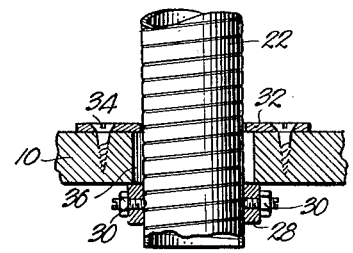
Fig. 2 is a bottom perspective view thereof illustrating the discharge end of the means for directing exhaust gases toward the cutting zone and Fig. 3 is an enlarged detailed fragmentary sectional view taken on line III—III of Fig. 2.
Figure 2:
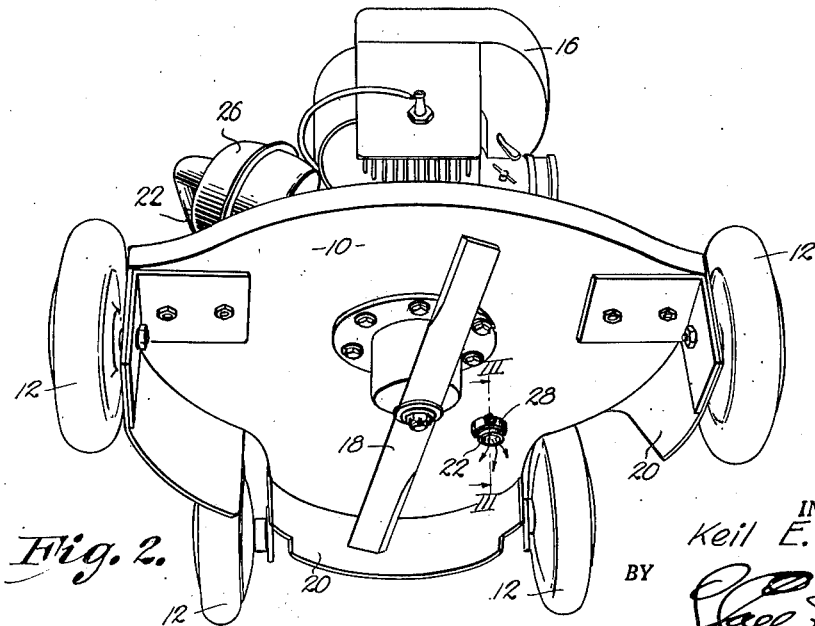

Power driven mowing machines of the type conventionally used include a frame broadly designated by the numeral 10, wheels 12 on said frame, a handle 14 for manually manipulating the machine and an engine 16 joined to a cutting blade 18 that is mounted for rotation in a horizontal plane. Depending walls 20 are usually mounted on frame 10 to establish a relatively closed chamber or zone beneath frame 10 wherein the grass is cut by blade 18. Due to the rotating action of blade 18 the grass cuttings often collect in bunches or "wind rows" that create an undesirable situation. If the bunches of grass cuttings are allowed to remain on the lawn, they will kill the grass therebeneath and, therefore, it becomes necessary for keepers of fine lawns to rake the cuttings after a lawn mower of the type illustrated has been used.

The undesirable feature just mentioned is overcome when using a mowing machine having means for dispersing the cuttings. In the instance shown, this said means comprises a conduit 22 connected with the exhaust 24 of engine 16. Since a muffler 26 is desirable, it should be interposed between conduit 22 and exhaust 24. Conduit 22 is flexible in character and extends to a point beneath frame 10 and above blade 18 where the exhaust gases or fluid is directed downwardly into the cutting zone defined by frame 10 and depending walls 20.

It is important that the end of conduit 22 be placed rearwardly of the axis of rotation of blade 18 and that the end of conduit 22 be so held as to direct the blast of air and gases toward a point where the cuttings usually collect. In the instance illustrated, the end of conduit 22 is rearwardly and to one side of the axis of rotation of blade 18. A collar 28 having set screws 30 thereon holds the outlet end of conduit 22 in a desirable position with respect to the distance above the ground over which the machine is being wheeled. A plate 32 secured to frame 10 by screws or analogous means 34 holds conduit 22 in spaced relation to frame 10 after it has been passed through hole 36. Thus if the frame or platform 10 is formed of wood or other combustible substance, conduit 22 will be held a safe distance therefrom and danger of burning will be obviated.

Such structure as just described is capable of preventing objectionable collection of grass cuttings and while the specific form of the means is in the nature of that shown and described, it is desirable to be limited only by the spirit of the invention and scope of the appended claim.

Having thus described my invention, what I claim as new and desire to secure by Letters Patent is:

In combination with a mowing machine having a mobile, substantially horizontal bed, a vertical cutter shaft extending through said bed, and a cutter blade on said shaft below the bed and adapted to dispose its cuttings into a windrow along one side of said shaft as the mowing machine is placed in operation; a combined cutter shaft rotating mechanism and means for dispersing said windrow of cuttings comprising an internal combustion engine mounted on said bed and operably coupled with said shaft, and an elongated exhaust pipe forming a part of said engine, the longitudinal axis of a portion of said pipe remote from the engine being substantially parallel with said shaft and extending through the bed in spaced relationship to the shaft, said portion of the pipe being disposed on said one side of the shaft between the normally rearmost end of the bed and the shaft and terminating in an open end spaced above said cutter blade.

KEIL E. HILEMAN.

REFERENCES CITED

The following references are of record in the file of this patent:

UNITED STATES PATENTS

| Number | Name | Date |
|---|---|---|
| 718,458 | Holfert | Jan. 13, 1903 |
| 962,780 | Nelson | June 28, 1910 |
| 1,794,658 | Walsh | Mar. 3, 1931 |
| 1,899,564 | Frey | Feb. 28, 1933 |
| 2,176,175 | George et al. | Oct. 17, 1939 |
| 2,208,972 | Goodall | July 23, 1940 |